US012807017B2

(12) United States Patent
Niwa

(10) Patent No.: US 12,807,017 B2
(45) Date of Patent: Nov. 24, 2026

(54) POWER SUPPLY EQUIPMENT

(71) Applicant: TOYOTA JIDOSHA KABUSHIKI KAISHA, Aichi-ken (JP)

(72) Inventor: Yamato Niwa, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 1273 days.

(21) Appl. No.: 17/711,593

(22) Filed: Apr. 1, 2022

(65) Prior Publication Data

US 2022/0314826 A1 Oct. 6, 2022

(30) Foreign Application Priority Data

Apr. 2, 2021 (JP) ................................ 2021-063556

(51) Int. Cl.

| | |
|---|---|
| ***B60L 53/302*** | (2019.01) |
| ***B60L 53/16*** | (2019.01) |
| ***B60L 53/20*** | (2019.01) |
| ***B60L 58/26*** | (2019.01) |
| *B60L 53/18* | (2019.01) |

(52) U.S. Cl.

CPC ............. *B60L 53/302* (2019.02); *B60L 53/16* (2019.02); *B60L 53/20* (2019.02); *B60L 58/26* (2019.02); *B60L 53/18* (2019.02)

(58) Field of Classification Search

CPC ...... Y02T 90/12; Y02T 10/7072; Y02P 80/10; B60L 53/302

See application file for complete search history.

(56) References Cited

U.S. PATENT DOCUMENTS

| | | | | |
|---|---|---|---|---|
| 2001/0003416 A1* | 6/2001 | Kajiura | .................. | B60L 53/31 320/109 |
| 2013/0307477 A1* | 11/2013 | Reinschke | ............. | B60L 53/30 320/109 |
| 2014/0239887 A1 | 8/2014 | Hamada et al. | | |
| 2015/0094989 A1* | 4/2015 | Collet | .................... | F24T 10/10 702/188 |

(Continued)

FOREIGN PATENT DOCUMENTS

| | | |
|---|---|---|
| CN | 103429455 A | 12/2013 |
| CN | 110466376 A | 11/2019 |
| JP | 2011-153459 A | 8/2011 |

(Continued)

*Primary Examiner* — Drew A Dunn

(74) *Attorney, Agent, or Firm* — HAUPTMAN HAM, LLP

(57) ABSTRACT

Power supply equipment at least partially provided under a ground surface and capable of supplying power to a vehicle comprises a connector connectable to the vehicle in order to supply power to the vehicle on the ground surface, a power supply circuit (a power conversion circuit) that supplies power to the connector, and a cooler (a fin) that cools the power supply circuit using a substance existing under the ground surface. Thus, the power supply circuit that supplies power for feeding power to the vehicle is cooled by using the substance existing under the ground surface. The substance existing under the ground surface is normally lower in temperature than a heat generating portion of the power supply circuit. Therefore, the substance having a low temperature is used to cool the heat generating portion of the power supply circuit. The power supply equipment can thus efficiently exhaust heat.

10 Claims, 8 Drawing Sheets

(56) References Cited

U.S. PATENT DOCUMENTS

| | | | | |
|---|---|---|---|---|
| 2018/0257501 | A1* | 9/2018 | Hähre | B60L 53/57 |
| 2019/0016223 | A1 | 1/2019 | Goetz et al. | |

FOREIGN PATENT DOCUMENTS

| | | | |
|---|---|---|---|
| JP | 2012095426 | A * | 5/2012 |
| JP | 2013-085368 | A | 5/2013 |
| JP | 2013-241084 | A | 12/2013 |
| JP | 5475407 | B2 | 4/2014 |
| JP | 2019-022438 | A | 2/2019 |
| JP | 2019-151195 | A | 9/2019 |
| JP | 2020-102914 | A | 7/2020 |

* cited by examiner

POWER SUPPLY EQUIPMENT

This nonprovisional application is based on Japanese Patent Application No. 2021-063556 filed on Apr. 2, 2021 with the Japan Patent Office, the entire contents of which are hereby incorporated by reference.

BACKGROUND

Field

The present disclosure relates to power supply equipment, and more specifically to power supply equipment at least partially provided under a ground surface and capable of supplying power to a vehicle.

Description of the Background Art

Japanese Patent No. 5475407 discloses power supply equipment that can be accommodated under a ground surface. The power supply equipment comprises a base pole (a fixed portion) and a charging pole (a movable portion). The user can pull out the charging pole above the ground surface by holding a handle that is provided on a top surface (or a ceiling portion) of the charging pole accommodated under the ground surface, and pulling the charging pole upward.

SUMMARY

For power supply equipment having a structure as disclosed in Japanese Patent No. 5475407, when a heat generating portion such as a power converter provided under the ground surface is compared with that provided on the ground surface, the former has a problem in that it is difficult to radiate heat.

The present disclosure has been made to solve the above-described problem, and an object thereof is to provide power supply equipment capable of efficiently exhausting heat.

Power supply equipment according to the present disclosure is power supply equipment at least partially provided under a ground surface and capable of supplying power to a vehicle, and comprises: a connector cable that is connectable to the vehicle to supply power to the vehicle on the ground surface; a power converter that supplies power to the connector cable; and a cooler that cools the power converter using a substance existing under the ground surface.

According to such a configuration, the power converter that supplies power for supplying power to the vehicle is cooled by using the substance existing under the ground surface. The substance existing under the ground surface is normally lower in temperature than the heat generating portion of the power converter. Therefore, the substance having a low temperature is used to cool the heat generating portion of the power converter. As a result, the power supply equipment can efficiently exhaust heat.

The cooler may include a fin capable of heat transfer from the power converter, and the fin may be disposed in contact with the substance. According to such a configuration, the heat generating portion of the power converter is cooled by heat transfer by the fin in contact with the substance. As a result, the power supply equipment can efficiently exhaust heat.

The substance may be a fluid, and the cooler may include a passage unit that passes the substance to the power converter. According to such a configuration, the heat generating portion of the power converter is cooled by heat transfer to the substance flowing in contact with the heat generating portion of the power converter. As a result, the power supply equipment can efficiently exhaust heat.

The passage unit may draw the substance from a source located under the ground surface, pass the substance to the power converter, and thereafter return the substance to the source. According to such a configuration, the cold substance drawn from the source located under the ground surface removes heat from the heat generating portion of the power converter, and is thereafter returned to the source. Therefore, the heat of the heat generating portion of the power converter is transferred to the source of the cold substance. As a result, the power supply equipment can efficiently exhaust heat.

The passage unit may discharge the substance on the ground surface after the substance is passed through the power converter. According to such a configuration, the cold substance drawn from the source located under the ground surface is discharged on the ground surface after the cold substance removes heat from the heat generating portion of the power converter. Thus, the heat of the heat generating portion of the power converter is discharged to the atmosphere above the ground surface, and the atmosphere above the ground surface normally has a temperature lower than that of the heat generating portion. As a result, the power supply equipment can efficiently exhaust heat.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, embodiments of the present disclosure will be described with reference to the drawings. In the following description, identical components are identically denoted. Their names and functions are also identical. Accordingly, they will not be described repeatedly in detail.

Figure 1:
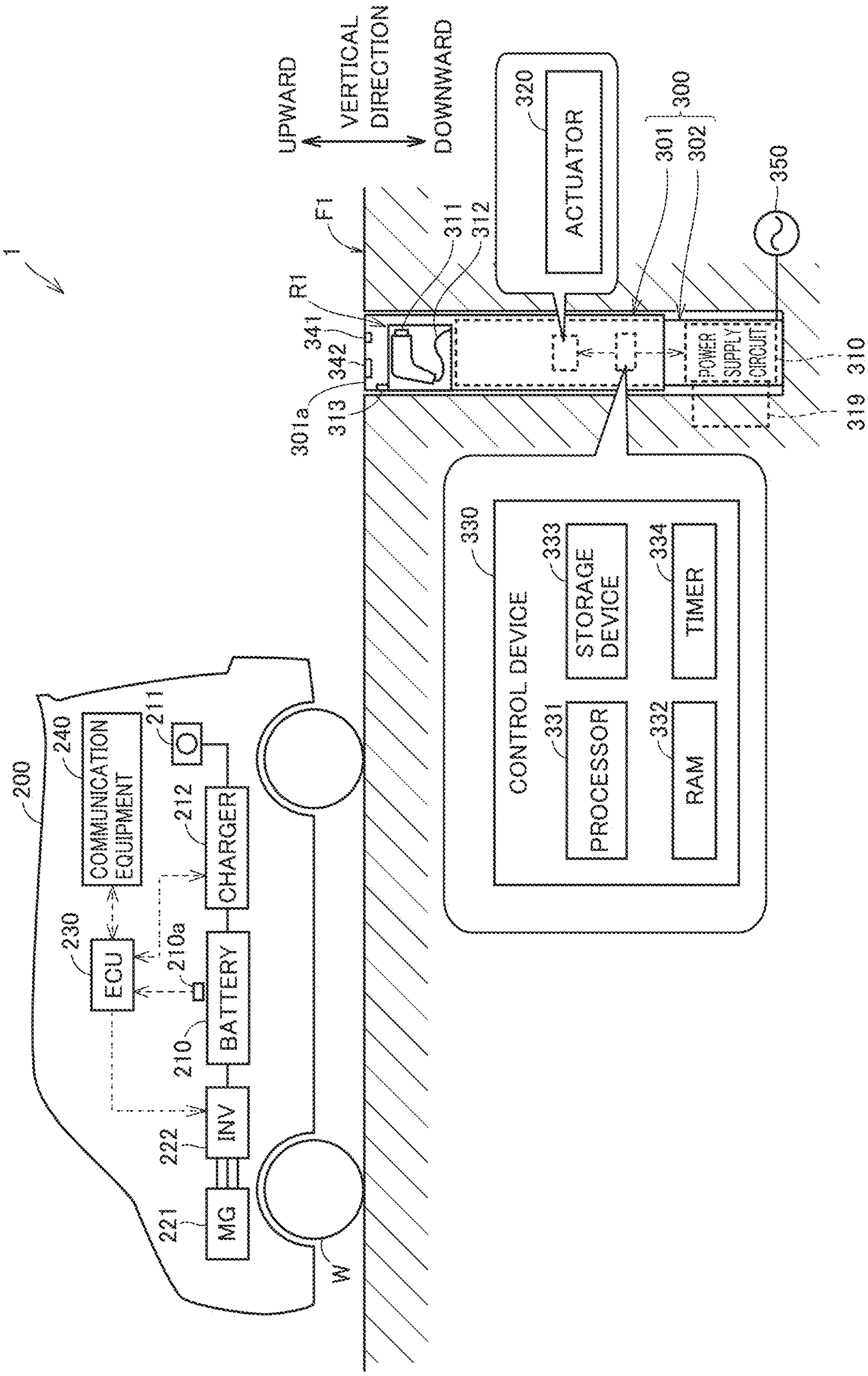
FIG. 1 is a diagram showing a configuration of a vehicle and power supply equipment according to an embodiment.

FIG. 1 is a diagram showing a configuration of a vehicle 200 and power supply equipment according to an embodiment. The power supply equipment according to the present embodiment is an electric vehicle supply equipment (EVSE) 300 shown in FIG. 1.

Referring to FIG. 1, a power supply system 1 comprises EVSE 300. EVSE 300 is configured to be accommodatable under a ground surface F1. EVSE 300 corresponds to power supply equipment of an underground type (power supply equipment that can be accommodated under a ground surface). A state of EVSE 300 shown in FIG. 1 is a state in which EVSE 300 is accommodated under ground surface F1 (hereinafter also referred to as an "accommodated state").

EVSE 300 includes a movable portion 301 and a fixed portion 302. Movable portion 301 and fixed portion 302 each have a casing in the form of a quadrangular prism. Note that the casing of movable portion 301 has a cable accommodating portion, as will be described hereinafter. Each casing may be made of metal or may be made of plastic. Each casing may have a waterproofed surface. The casing of movable portion 301 is disposed outside the casing of fixed portion 302 such that the central axes of the casings match each other, and the casing of movable portion 301 is larger than the casing of fixed portion 302 in a cross section perpendicular to the central axis of the casing. Movable portion 301 is displaceable in the vertical direction (an upward/downward direction) along an outer peripheral surface of fixed portion 302.

EVSE 300 is installed in a recess R1 extending downward from ground surface F1. In the accommodated state, EVSE 300 is entirely accommodated inside recess R1. Fixed portion 302 is fixed to the bottom surface of recess R1. Fixed portion 302 has a power supply circuit 310, an actuator 320, and a control device 330 in the casing. Movable portion 301 is driven by actuator 320 and displaced relative to fixed portion 302. A seal member (not shown) may be provided in a gap between the outer peripheral surface of the casing of movable portion 301 and an internal wall of recess R1.

Movable portion 301 has a space for accommodating a connector 311 and a power feed cable 312 (hereinafter referred to as a "cable accommodating portion"). The cable accommodating portion is for example a recess formed on a side surface of movable portion 301 by processing a portion of the casing in the form of a quadrangular prism of movable portion 301. Connector 311 is provided at a first end of power feed cable 312. A second end of power feed cable 312 (an end opposite to the first end) is connected to power supply circuit 310 via an electric wire (not shown). In the accommodated state, movable portion 301 has connector 311 and power feed cable 312 in the cable accommodating portion. In the present embodiment, connector 311 corresponds to an example of a "power feed port" according to the present disclosure. Power feed cable 312 (including connector 311) may be configured to be detachably attachable to movable portion 301. In movable portion 301 with power feed cable 312 removed, a connector for power feed cable 312 (that is, a portion to which power feed cable 312 is attached) corresponds to a power feed port of movable portion 301.

Power supply circuit 310 includes a power conversion circuit. The power conversion circuit is configured to receive power from an alternating current (AC) power supply 350, convert the received power into power suitable for charging vehicle 200, and supply the converted power to movable portion 301 (more specifically, to power feed cable 312). AC power supply 350 supplies AC power to power supply circuit 310. AC power supply 350 may be a commercial power supply (e.g., a power system provided by a power company). Power supply circuit 310 is controlled by control device 330.

Power feed cable 312 is elastic and flexible. The cable accommodating portion may be provided with a cable reel configured to be capable of winding power feed cable 312 thereon. The cable reel may be a mechanical automatic winding device (e.g., a spring-loaded cable reel). A lid (not shown) may also be provided for opening and closing the cable accommodating portion. A sensor may be provided in the cable accommodating portion to sense whether connector 311 and power feed cable 312 are accommodated in the cable accommodating portion.

In the accommodated state, movable portion 301 has a top surface 301*a* flush with ground surface F1. Actuator 320 is configured to directly or indirectly provide driving force to movable portion 301 to move movable portion 301 in the vertical direction (see FIG. 2, which will be described hereinafter). Actuator 320 may be an electric actuator that generates driving force by using power supplied from power supply circuit 310. Movable portion 301 may be displaced by a mechanism of a rack and pinion type. For example, a rack gear may be fixed to movable portion 301, and actuator 320 may rotate and thus drive a pinion gear meshed with the rack gear. Alternatively, a rod connected to a piston may be fixed to movable portion 301, and actuator 320 may move the piston hydraulically or pneumatically. Alternatively, actuator 320 may use power to generate magnetic force, and use the generated magnetic force to directly provide driving force to movable portion 301. Actuator 320 is controlled by control device 330.

Figure 2:
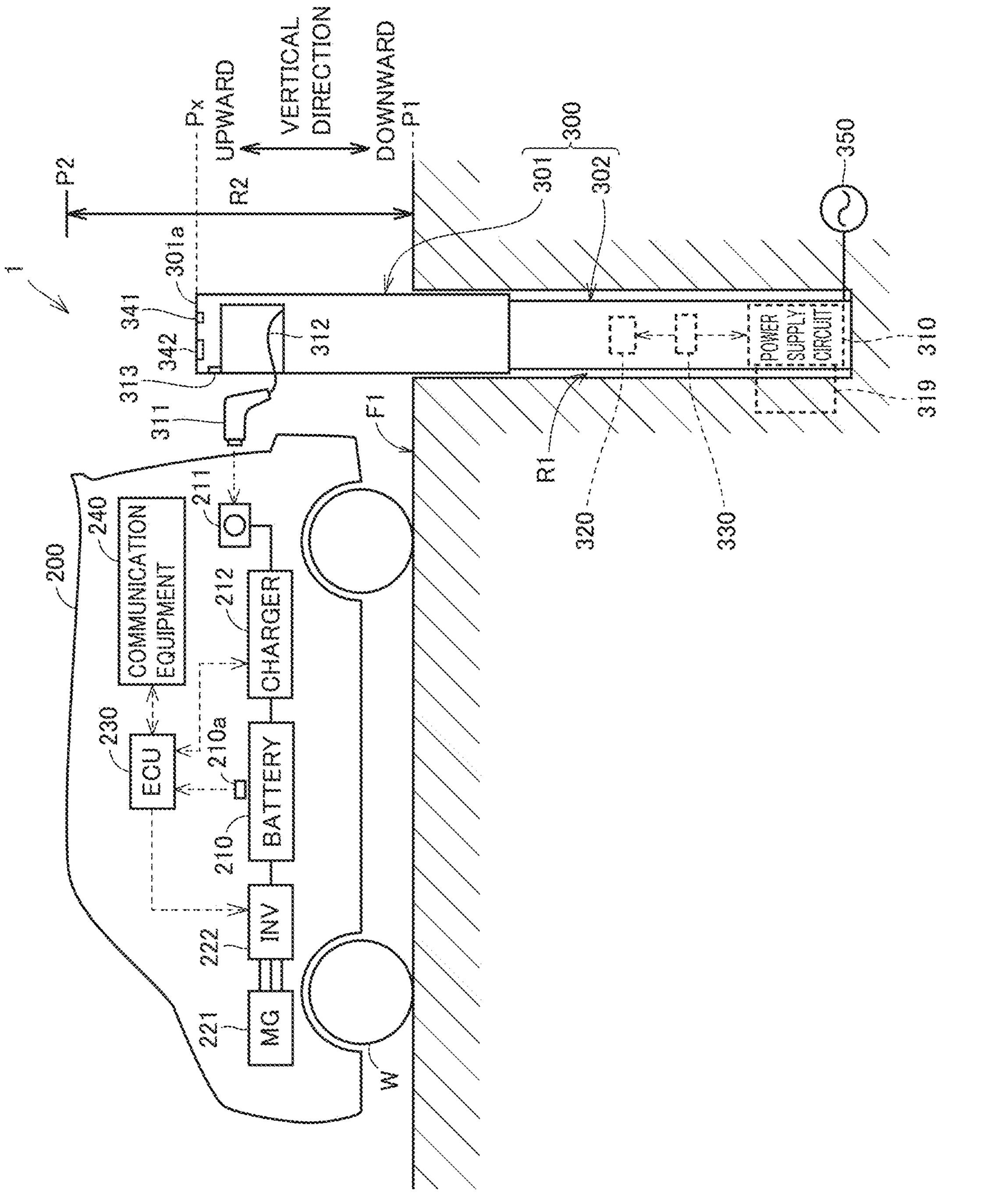
FIG. 2 shows a state in which a movable portion is elevated.

FIG. 2 shows a state in which movable portion 301 is elevated. Referring to FIG. 2, movable portion 301 is displaced (or ascends and descends) in the vertical direction so as to change a position Px of top surface 301*a*. Hereinafter, for convenience of description, position Px of top surface 301*a* of movable portion 301 is regarded as the position of movable portion 301.

Movable portion 301 is configured to be displaced within a movability range R2. Movability range R2 has a lower limit position P1 equal in level to ground surface F1. When the position of movable portion 301 is lower limit position P1, movable portion 301 (including the cable accommodating portion) is entirely accommodated under ground surface F1. When the position of movable portion 301 is higher than lower limit position P1, at least a portion of movable portion 301 is exposed above ground surface F1. Movability range R2 has an upper limit position P2 set to a position sufficiently high in level relative to an inlet of a typical vehicle. When the position of movable portion 301 is upper limit position P2, movable portion 301 has the cable accommodating portion (connector 311 and power feed cable 312) exposed above ground surface F1. Even when the position of movable portion 301 is lower than upper limit position P2 (e.g., position Px shown in FIG. 2), the cable accommodating portion can be exposed above ground surface F1. Thus, movability range R2 includes a first position (for example, lower limit position P1) in which a power feed port is accommodated under the ground surface and a second position (for example, upper limit position P2) in which the power feed port is exposed above the ground surface. While in the present embodiment, lower limit position P1 is the same position as ground surface F1, lower limit position P1 may be set at a position lower than ground surface F1.

Referring again to FIG. 1, movable portion 301 further includes a communication device 341, a notification device 342, and a touch panel display 313. Communication device 341 is configured to be capable of wirelessly communicating with other devices (e.g., vehicle 200 and a server). Communication device 341 receives information from outside EVSE 300 and transmits the received information to control device 330. Control device 330 transmits a state of EVSE 300 to another device via communication device 341.

Notification device 342 is provided near top surface 301*a* of movable portion 301. In the present embodiment, notification device 342 includes a lamp and a speaker. The lamp may be an LED (light emitting diode) lamp. Control device 330 controls the lamp's state (for example to turn on/flash/turn off the lamp). Control device 330 controls the speaker to provide audible notification (including speech). Touch panel display 313 receives an input from a user and displays various information. Touch panel display 313 is configured to receive instructions for supplying power (for example, instructions to start and stop supplying power). Touch panel display 313 is also configured to display a power supply status of EVSE 300 (that is, whether it is supplying power or stops supplying power). Touch panel display 313 is controlled by control device 330.

Control device 330 may be a computer. Control device 330 includes a processor 331, a RAM (Random Access Memory) 332, a storage device 333, and a timer 334. Processor 331 can for example be a CPU (Central Processing Unit). Storage device 333 is configured to be capable of saving stored information. Storage device 333 stores programs, and in addition, information used in the programs (e.g., maps, mathematical expressions, and various parameters). In the present embodiment, processor 331 executes a program stored in storage device 333 to execute various types of control in EVSE 300. Note, however, that the various types of control in EVSE 300 are not limited to execution by software, and can be executed by dedicated hardware (or electronic circuitry). Control device 330 may include any number of processors, and each processor may be prepared for a predetermined control.

Timer 334 is configured to inform processor 331 that a set time arrives. When the time set in timer 334 arrives, timer 334 signals processor 331 accordingly. Timer 334 may be hardware (a timer circuit) or may be implemented by software. Further, control device 330 can obtain the current time using a real-time clock (RTC) circuit (not shown) incorporated in control device 330.

Vehicle 200 shown in FIGS. 1 and 2 is an electrically driven vehicle including a battery 210, a device (e.g., a motor generator (hereinafter referred to as "MG") 222 and an inverter (hereinafter referred to as an "INV") 221, which will be described hereinafter) for traveling by using power stored in battery 210, and a device (e.g., an inlet 211 and a charger 212 described hereinafter) for charging battery 210 by utilizing EVSE 300. Vehicle 200 according to the present embodiment is a battery electric vehicle (BEV) excluding an engine (an internal combustion engine).

Vehicle 200 further comprises an electronic control unit (hereinafter referred to as an "ECU") 230 and communication equipment 240. ECU 230 may be a computer. ECU 230 includes a processor, a RAM, and a storage device (none of which is shown). Various types of vehicular control are executed by the processor executing a program stored in the storage device. Note, however, that the vehicular control is not limited to execution by software, and can be executed by dedicated hardware (or electronic circuitry).

ECU 230 is configured to communicate with an outside of vehicle 200 through communication equipment 240. Communication equipment 240 includes various communication interfaces (I/Fs). Communication equipment 240 includes a communication I/F for wirelessly communicating with EVSE 300.

Battery 210 includes a secondary battery such as a lithium ion battery or a nickel metal hydride battery. The secondary battery may be a battery pack or a solid-state battery. Instead of the secondary battery, another power storage device such as an electric double layer capacitor may be used.

Vehicle 200 further comprises a monitoring module 210*a* to monitor a state of battery 210. Monitoring module 210*a* includes various sensors to sense a state (e.g., voltage, current, and temperature) of battery 210, and outputs a result of sensing to ECU 230. In addition to the sensor function, monitoring module 210*a* may be a battery management system (BMS) further having a function to estimate state of charge (SOC), a function to estimate state of health (SOH), a function to equalize cell voltage, a function for diagnosis, and a function for communication. ECU 230 can obtain a state of battery 210 (e.g., temperature, current, voltage, SOC, and internal resistance thereof) based on an output of monitoring module 210*a*.

Vehicle 200 comprises MG 221 and INV 222 for electrically powered driving. MG 221 is for example a three-phase AC motor generator. MG 221 is configured to be driven by INV 222 and rotate a driving wheel W of vehicle 200. INV 222 drives MG 221 using power supplied from battery 210. Further, MG 221 performs regenerative power generation, and supplies the generated power to battery 210 via INV 222. The system to drive vehicle 200 is not limited to front wheel driving shown in FIGS. 1 and 2, and may be rear wheel driving or four wheel driving.

Vehicle 200 comprises inlet 211 and charger 212 for contact charging. Inlet 211 is configured to allow connector 311 of power feed cable 312 of EVSE 300 to be connected thereto. Inlet 211 and connector 311 each have a contact incorporated therein, and when connector 311 is attached to inlet 211, the contacts come into contact with each other, and inlet 211 and connector 311 are electrically connected to each other. Hereinafter, a state in which connector 311 is connected to inlet 211 (that is, EVSE 300 and vehicle 200 are electrically connected to each other via power feed cable 312) will be referred to as a "plug-in state." Further, a state in which connector 311 is disconnected from inlet 211 (that is, EVSE 300 and vehicle 200 are electrically disconnected from each other) will be referred to as a "plug-out state."

Charger 212 includes a power conversion circuit (not shown). The power conversion circuit converts power that is supplied from an outside of the vehicle and received by inlet 211 into power suitable for charging battery 210. For example when charger 212 receives AC power from inlet 211, charger 212 converts the received AC power into direct-current (DC) power and supplies the DC power to battery 210. Charger 212 is controlled by ECU 230.

When not in use, EVSE 300 is in an accommodated state (e.g., the state shown in FIG. 1). Hereinafter, an example of a flow of an operation in which a user of vehicle 200 operates EVSE 300 to charge battery 210 will be described.

When the user parks vehicle 200 in a parking space near EVSE 300, ECU 230 of vehicle 200 performs wireless communication with EVSE 300 via communication equipment 240 to elevate movable portion 301. For example, ECU 230 of vehicle 200 elevates movable portion 301 to a position in which connector 311 of power feed cable 312 is easily connected to inlet 211 of vehicle 200 (for example, position Px shown in FIG. 2). Thus, EVSE 300 enters a state ready for plug-in. Hereinafter, a state in which movable portion 301 is elevated to a position ready for plug-in will also be referred to as an "elevated state."

For example, when EVSE 300 is in the elevated state shown in FIG. 2, the user takes out power feed cable 312 from the cable accommodating portion of movable portion 301 and extends power feed cable 312 toward vehicle 200. Then, the user connects connector 311 of power feed cable

312 to inlet 211 of vehicle 200. Thus, vehicle 200 and EVSE 300 enter the plug-in state. In the plug-in state, vehicle 200 and EVSE 300 can perform wired communication therebetween and transmit and receive power therebetween. ECU 230 of vehicle 200 communicates with control device 330 of EVSE 300 via power feed cable 312.

The user operates touch panel display 313 of EVSE 300 in the plug-in state to cause EVSE 300 to supply power. EVSE 300 starts supplying power in accordance with an instruction received from the user. Specifically, in EVSE 300, power supply circuit 310 receives AC power supplied from AC power supply 350, converts (e.g., transforms) the received AC power into AC power suitable for feeding vehicle 200, and supplies the converted power to power feed cable 312. In the plug-in state, power supplied from power supply circuit 310 to power feed cable 312 is input to inlet 211 of vehicle 200. Then, vehicle 200 has battery 210 charged. Specifically, the power input to inlet 211 is supplied to battery 210 via charger 212. While battery 210 is charged, control device 330 controls power supply circuit 310 to adjust power to be supplied, and ECU 230 controls charger 212 to adjust power to be charged. Thus, EVSE 300 is configured to charge a power storage device mounted in a vehicle.

Thereafter when charging battery 210 is completed, the user operates touch panel display 313 to input a stop instruction to EVSE 300 to stop supplying power. It should be noted, however, that when battery 210 is fully charged, the stop instruction is automatically sent from ECU 230 to control device 330. In response to the stop instruction, EVSE 300 stops supplying power. Thereafter, the user pulls out connector 311 of power feed cable 312 from inlet 211 of vehicle 200 and accommodates power feed cable 312 in the cable accommodating portion. Thus, vehicle 200 and EVSE 300 enter the plug-out state. When the user returns power feed cable 312 to the cable accommodating portion, control device 330 lowers movable portion 301 to lower limit position P1 of movability range R2. When the position of movable portion 301 reaches lower limit position P1, ground surface F1 is flush with top surface 301*a* of movable portion 301. In this way, EVSE 300 again enters the accommodated state.

EVSE 300 having the configuration shown in FIGS. 1 and 2 may be set at a plurality of locations. These EVSEs 300 may be configured to be capable of communicating with one another. They may communicate wirelessly or via a wire.

Figure 3:
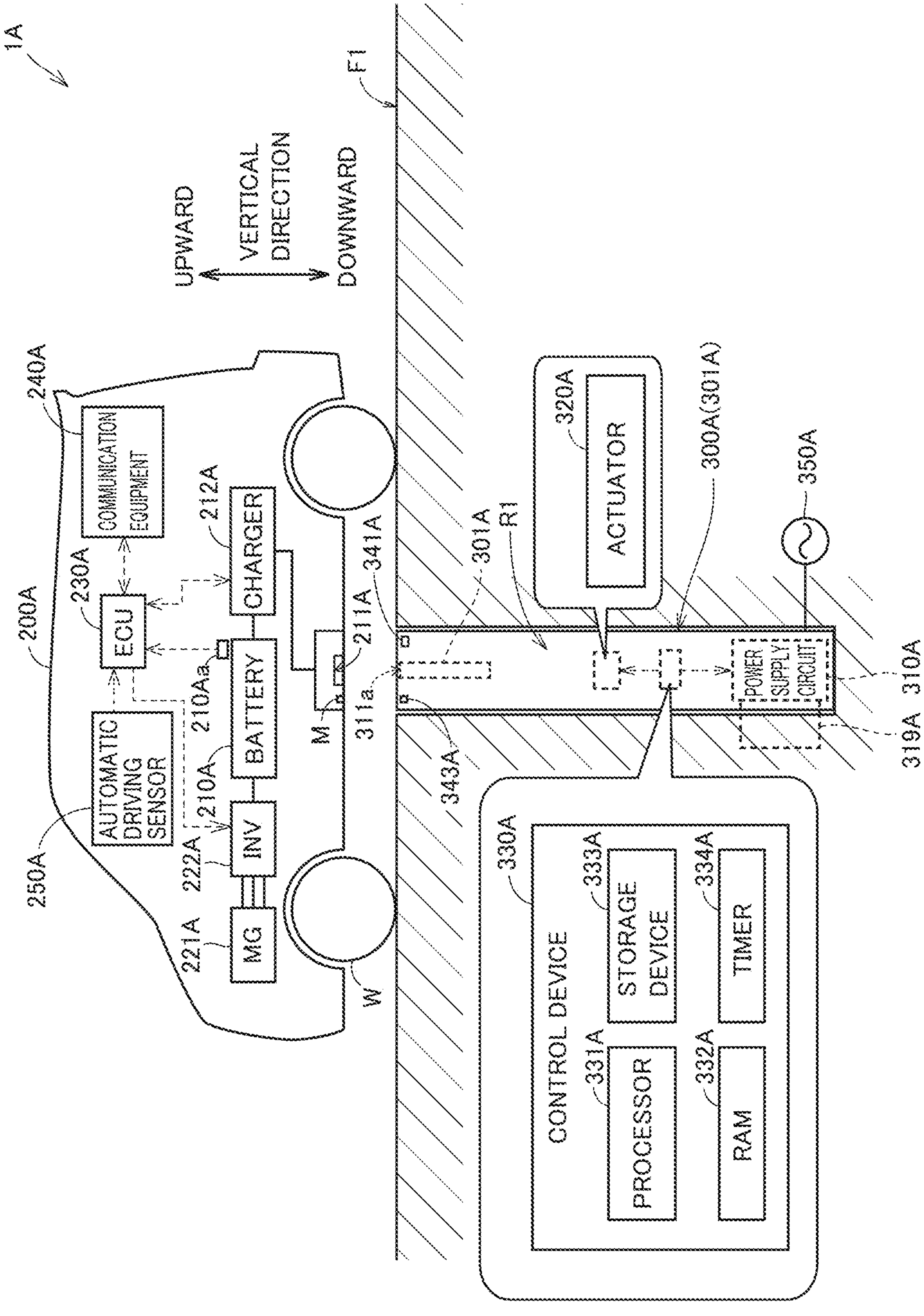
FIG. 3 is a diagram showing a configuration of a vehicle and another type of power supply equipment according to the embodiment.

In FIGS. 1 and 2, EVSE 300 has been described as power supply equipment. However, the power supply equipment is not limited to EVSE 300, and may be of another type. FIG. 3 is a diagram showing a configuration of vehicle 200 and another type of power supply equipment according to the present embodiment.

A power supply system 1A comprises EVSE 300A. EVSE 300A is configured to be accommodatable under ground surface F1. EVSE 300A corresponds to power supply equipment of an underground type (power supply equipment that can be accommodated under a ground surface). A state of EVSE 300A shown in FIG. 3 is a state in which EVSE 300A is accommodated under ground surface F1 (hereinafter also referred to as an "accommodated state").

EVSE 300A is installed in recess R1 extending downward from ground surface F1. In the accommodated state, EVSE 300A is entirely accommodated inside recess R1. EVSE 300A has a casing 302A in the form of a quadrangular prism. Casing 302A of EVSE 300A is fixed to a bottom surface of recess R1. Casing 302A may be made of metal or may be made of plastic. Casing 302A may have a waterproofed surface.

EVSE 300A comprises a power supply circuit 310A, an actuator 320A, and a control device 330A in casing 302A. EVSE 300A further comprises a movable portion 301A displaceable in the vertical direction (or the upward/downward direction). Movable portion 301A is a rod-shaped member having a tip with a connector 311*a*. Actuator 320A moves movable portion 301A. In the accommodated state, movable portion 301A is entirely accommodated in casing 302A of EVSE 300A, and EVSE 300A has a top surface flush with ground surface F1. A seal member may be provided in a gap between an outer peripheral surface of casing 302A of EVSE 300A and an inner wall of recess R1.

Connector 311*a* of movable portion 301A is connected to power supply circuit 310A via an electric wire (not shown). Movable portion 301A may include a communication line connected to control device 330A in addition to a power line connected to power supply circuit 310A. Power supply circuit 310A is configured to receive power from AC power supply 350A and supply power to movable portion 301A (more specifically, connector 311*a*). AC power supply 350A supplies AC power to power supply circuit 310A. AC power supply 350A may be a commercial power supply (e.g., a power system provided by a power company). Power supply circuit 310A is controlled by control device 330A.

Actuator 320A is configured to directly or indirectly provide driving force to movable portion 301A to move movable portion 301A in the vertical direction. Actuator 320A may be an electric actuator that generates driving force by using power supplied from power supply circuit 310A. Movable portion 301A may be displaced by a mechanism of a rack and pinion type. For example, a rack gear may be fixed to movable portion 301A, and actuator 320A may rotate and thus drive a pinion gear meshed with the rack gear. Alternatively, a rod connected to a piston may be fixed to movable portion 301A, and actuator 320A may move the piston hydraulically or pneumatically. Alternatively, actuator 320A may use power to generate magnetic force, and use the generated magnetic force to directly provide driving force to movable portion 301A. Actuator 320A is controlled by control device 330A.

Control device 330A is the same as control device 330 described with reference to FIG. 1, and accordingly, will not be described redundantly.

EVSE 300A is connected in an underfloor connection system (that is, with a target vehicle parked on movable portion 301A accommodated under ground surface F1, connector 311*a* of movable portion 301A is elevated toward the target vehicle from under a floor of the target vehicle and connected to an inlet provided at a lower portion of the target vehicle). Connector 311*a* of movable portion 301A is configured to be connectable to the inlet provided at the lower portion of the target vehicle when the target vehicle is parked at a predetermined power supplying position. The power supplying position of EVSE 300A according to the present embodiment is a position in which connector 311*a* matches the inlet of the target vehicle in plan view (that is, a position in which connector 311*a* has X and Y coordinates matching those of the inlet). Movable portion 301A is configured to be displaced within a movability range including a first position in which connector 311*a* is accommodated under ground surface F1 and a second position in which connector 311*a* is connected to the inlet of the target vehicle on ground surface F1. In the present embodiment, vehicle 200A corresponds to the target vehicle. Vehicle 200A has a lower portion provided with an inlet 211A.

Figure 4:
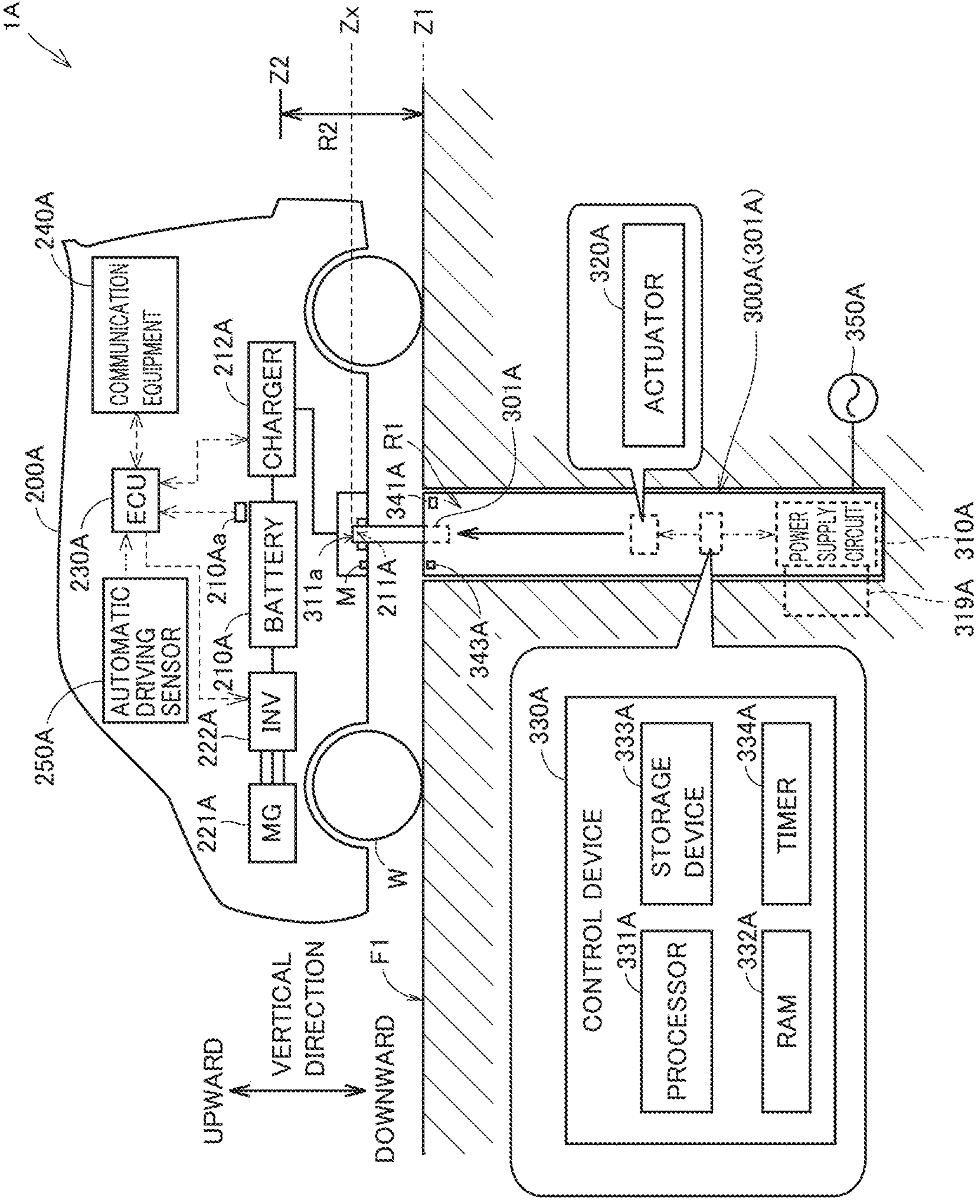
FIG. 4 shows a state in which a movable portion is elevated.

FIG. 2 shows a state in which movable portion 301A is elevated. Referring to FIG. 4, movable portion 301A is displaced (or ascends and descends) in the vertical direction so as to change a position Zx of connector 311*a*. The state of EVSE 300A shown in FIG. 4 is a state in which connector 311*a* is elevated to a position (the second position) in which connector 311*a* is connected to inlet 211A of vehicle 200A (hereinafter also referred to as an "elevated state"). Hereinafter, for convenience of description, position Zx of connector 311*a* of movable portion 301A is regarded as the position of movable portion 301A.

Movable portion 301A is configured to be displaced within movability range R2. Movability range R2 has a lower limit position Z1 equal in level to ground surface F1. When the position of movable portion 301A is lower limit position Z1, movable portion 301A (including connector 311*a*) is entirely accommodated under ground surface F1 (see FIG. 3). When the position of movable portion 301A is higher than lower limit position Z1, connector 311*a* is exposed above ground surface F1. Movability range R2 has an upper limit position Z2 set to a position sufficiently high in level relative to the inlet of the target vehicle. Movability range R2 includes a first position (for example, lower limit position Z1) in which connector 311*a* is accommodated under the ground surface and a second position (for example, position Zx shown in FIG. 4) in which connector 311*a* is connected to the inlet of the target vehicle on the ground surface. While in the present embodiment, lower limit position Z1 is the same position as ground surface F1, lower limit position Z1 may be set at a position lower than ground surface F1.

EVSE 300A further comprises a parking sensor 343A and a communication device 341A. Parking sensor 343A is a sensor that obtains information of positional deviation indicating a relative positional relationship (for example, positional deviation in direction and distance) between the inlet of the target vehicle and connector 311*a*. Parking sensor 343A may obtain the information of positional deviation by recognizing a mark M provided in the vicinity of inlet 211A of vehicle 200A, for example. Parking sensor 343A may include at least one of a laser and a camera. A result of sensing by parking sensor 343A is output to control device 330A. Control device 330A can use the result of sensing by parking sensor 343A to determine whether the target vehicle is parked at the power supplying position. Control device 330A may determine that vehicle 200A is parked at the power supplying position for example when parking sensor 343A senses that vehicle 200A stops at the power supplying position and thereafter vehicle 200A continues a stationary state until a predetermined period of time elapses.

Communication device 341A is configured to be capable of wirelessly communicating with an external device (for example, vehicle 200A). Communication device 341A receives information from a device external to EVSE 300A and transmits the received information to control device 330A. Control device 330A transmits a state of EVSE 300A to another device via communication device 341A.

Vehicle 200A has the same configuration as vehicle 200 shown in FIG. 1 except for an automatic driving sensor 250A. Vehicle 200A is configured to be automatically drivable. Automatic driving sensor 250A is a sensor used for automatic driving. However, automatic driving sensor 250A may be used, as controlled as predetermined, when the vehicle is not automatically driven.

Automatic driving sensor 250A includes a sensor that obtains information for recognizing an environment external to vehicle 200A, and a sensor that obtains positional and postural information of vehicle 200A. Automatic driving sensor 250A may include for example at least one of a camera, a millimeter wave radar, and a lidar. Automatic driving sensor 250A may include for example at least one of IMU (Inertial Measurement Unit) and GPS (Global Positioning System) sensors. ECU 230A is configured to use various types of information obtained by automatic driving sensor 250A to control an accelerator device, brake device, and steering device (all not shown) of vehicle 200A to automatically drive vehicle 200A. ECU 230A permits a predetermined terminal to remotely control vehicle 200A, and when ECU 230A receives a command for automatic driving from the device that ECU 230A permits to remotely control vehicle 200A, ECU 230A follows the command to automatically drive vehicle 200A. Further, ECU 230A may be configured to follow a predetermined automatic driving program to automatically drive (e.g., park) the vehicle.

Vehicle 200A comprises inlet 211A and a charger 212A for contact charging. Inlet 211A is provided at a lower portion (for example, near a floor panel) of vehicle 200A. Near inlet 211A, mark M is provided for positional detection. Although not shown, vehicle 200A comprises a circuit to detect a connection status of inlet 211A (for example, a circuit to detect whether connector 311*a* is connected to inlet 211A).

Inlet 211A is configured to allow connector 311*a* of EVSE 300A to be connected thereto. Inlet 211A and connector 311*a* each have a contact incorporated therein, and when connector 311*a* is connected to inlet 211A, the contacts come into contact with each other, and inlet 211A and connector 311*a* are electrically connected to each other. Hereinafter, a state in which connector 311*a* is connected to inlet 211A (that is, EVSE 300A and vehicle 200A are electrically connected to each other) will be referred to as a "plug-in state." Further, a state in which connector 311*a* is disconnected from inlet 211A (that is, EVSE 300A and vehicle 200A are electrically disconnected from each other) will be referred to as a "plug-out state."

Charger 212A and battery 210A are similar to the FIG. 1 charger 212 and battery 210, respectively.

When not in use, EVSE 300A is in an accommodated state (for example, a state shown in FIG. 3). When a user of vehicle 200A charges battery 210A using EVSE 300A, vehicle 200A is parked at a power supplying position. The user of vehicle 200A may park vehicle 200A at the power supplying position by automatic driving (or automatic parking), or may park vehicle 200A at the power supplying position by manual driving (or driving by the user per se).

EVSE 300A having the configuration shown in FIGS. 3 and 4 may be set at a plurality of locations. These EVSEs 300A may be configured to be capable of communicating with one another. They may communicate wirelessly or via a wire.

Figure 5:
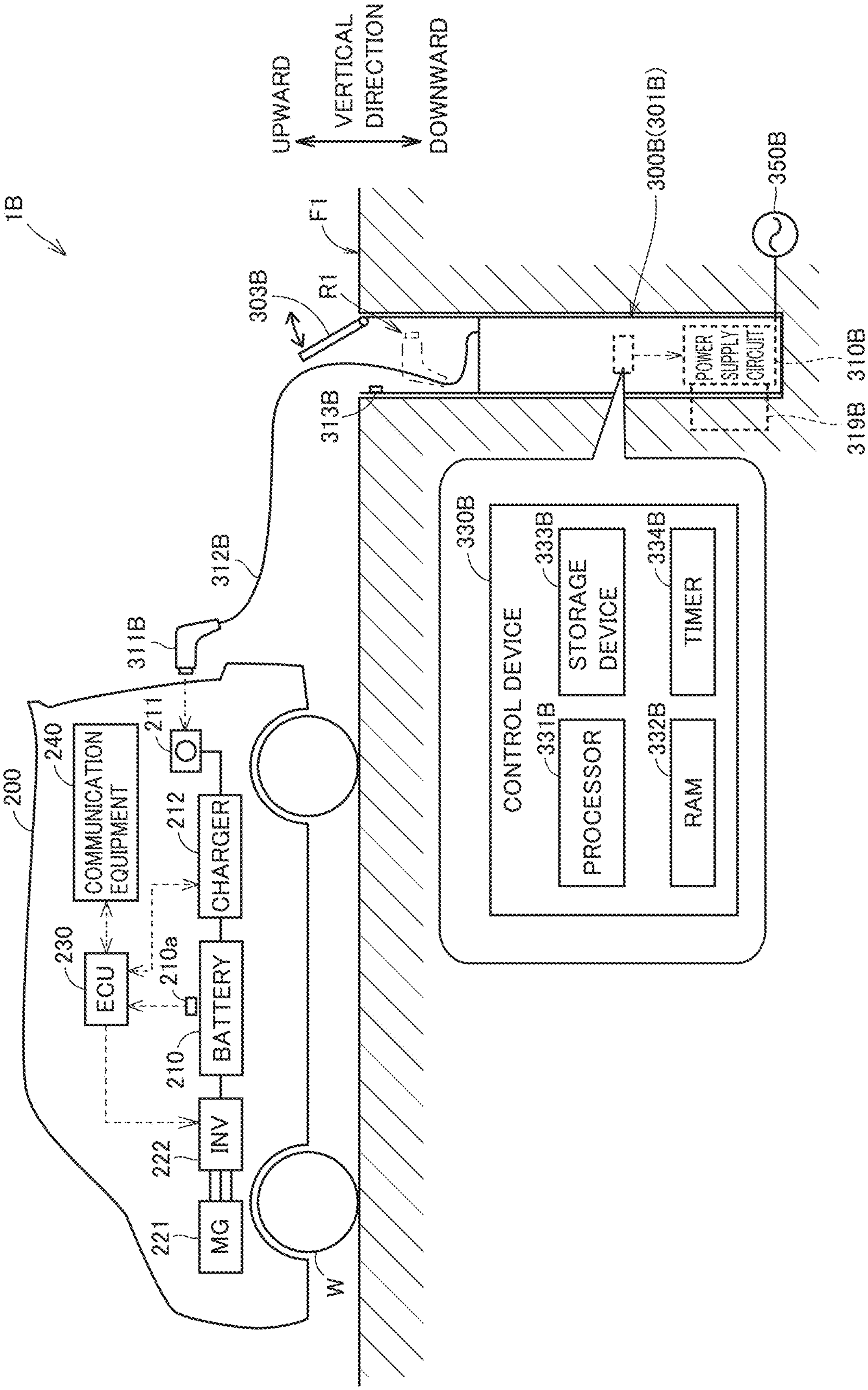
FIG. 5 is a diagram showing a configuration of a vehicle and still another type of power supply equipment according to the embodiment.

In FIGS. 1 and 2, EVSE 300 having movable portion 301 has been described. In FIGS. 3 and 4, EVSE 300A having movable portion 301A has been described. However, the power supply equipment is not limited to a type having a movable portion, and may be a type having no movable portion. FIG. 5 is a diagram showing a configuration of vehicle 200 and still another type of power supply equipment according to the present embodiment.

A power supply system 1B comprises EVSE 300B. EVSE 300B is accommodated under ground surface F1. EVSE 300B corresponds to power supply equipment of an underground type.

EVSE 300B comprises a casing 302B. Casing 302B is in the form of a quadrangular prism. A cable accommodating portion is formed in casing 302B. Casing 302B may be made of metal or may be made of plastic. Casing 302B may have a waterproofed surface.

EVSE 300B is installed in recess R1 extending downward from ground surface F1. In the accommodated state, EVSE 300B is entirely accommodated inside recess R1. Casing 302B is fixed to a bottom surface of recess R1. Casing 302B internally has a power supply circuit 310B and a control device 330B. A seal member (not shown) may be provided in a gap between an outer peripheral surface of casing 302B and an inner wall of recess R1.

Casing 302B has a space for accommodating a connector 311B and a power feed cable 312B (hereinafter referred to as a "cable accommodating portion"). The cable accommodating portion is for example a recess formed on a side surface of casing 302B in the form of a quadrangular prism by processing a portion of casing 302B. Connector 311B is provided at a first end of power feed cable 312B. A second end of power feed cable 312B (an end opposite to the first end) is connected to power supply circuit 310B via an electric wire (not shown). The accommodated state has connector 311 and power feed cable 312 in the cable accommodating portion. In the present embodiment, connector 311B corresponds to an example of the "power feed port" according to the present disclosure. Power feed cable 312B (including connector 311B) may be configured to be detachably attachable to casing 302B. For casing 302B having power feed cable 312B removed therefrom, a connector for power feed cable 312B (that is, a portion to which power feed cable 312B is attached) corresponds to a power feed port of casing 302B.

Power supply circuit 310B is configured to receive power from an AC power supply 350B and supply power to casing 302B (more specifically, power feed cable 312B). AC power supply 350B supplies AC power to power supply circuit 310B. AC power supply 350B may be a commercial power supply (e.g., a power system provided by a power company). Power supply circuit 310B is controlled by control device 330B.

Connector 311B and power feed cable 312B are similar to connector 311 and power feed cable 312, respectively, described with reference to FIG. 1. Casing 302B has an upper portion provided with a lid 303B that can be opened and closed. The user can open lid 303B to extract connector 311B and power feed cable 312B.

Control device 330B is the same as control device 330 described with reference to FIG. 1, and accordingly, will not be described redundantly. Vehicle 200 is the same as vehicle 200 described with reference to FIG. 1, and accordingly, will not be described redundantly.

When a user parks vehicle 200 in a parking space near EVSE 300B, the user takes out power feed cable 312B from the cable accommodating portion of casing 302B and extends power feed cable 312B toward vehicle 200. Then, the user connects connector 311B of power feed cable 312B to inlet 211 of vehicle 200. Thus, vehicle 200 and EVSE 300B enter the plug-in state. Charging is done in a flow similarly as shown in FIG. 1, and accordingly, will not be described redundantly. When charging ends, the user pulls out connector 311B of power feed cable 312B from inlet 211 of vehicle 200, and accommodates power feed cable 312B in the cable accommodating portion. Thus, vehicle 200 and EVSE 300B enter the plug-out state. When the user returns power feed cable 312B to the cable accommodating portion, the user closes lid 303B. In this way, EVSE 300B enters the accommodated state again.

EVSE 300B having the configuration shown in FIG. 5 may be set at a plurality of locations. These EVSEs 300B may be configured to be capable of communicating with one another. They may communicate wirelessly or via a wire.

Object and Configuration for Achieving the Object

As shown in FIGS. 1 to 5, when power supply equipment such as EVSEs 300, 300A, and 300B has a heat generating portion such as a power conversion circuit of power supply circuits 310, 310A, and 310B provided under a ground surface, it is more difficult to radiate heat than when the heat generation portion is located above the ground surface.

Accordingly, the presently disclosed power supply equipment is power supply equipment that is at least partially provided under the ground surface and capable of supplying power to vehicles 200, 200A, and comprises connectors 311, 311A, 311B connectable to vehicles 200, 200A in order to supply power to vehicles 200, 200A on the ground surface, power supply circuits 310, 310A, 310B (a power conversion circuit) that supply power to connectors 311, 311A, 311B, and a cooler that cools power supply circuits 310, 310A, 310B using a substance existing under the ground surface.

Thus, power supply circuits 310, 310A, and 310B that supply power for supplying power to vehicles 200 and 200A are cooled by using the substance existing under the ground surface. The substance existing under the ground surface is normally lower in temperature than the heat generating portion of power supply circuits 310, 310A, 310B. Therefore, the substance having a low temperature is used to cool the heat generating portion of power supply circuits 310, 310A, 310B. As a result, the power supply equipment can efficiently exhaust heat.

First Embodiment

Figure 6:
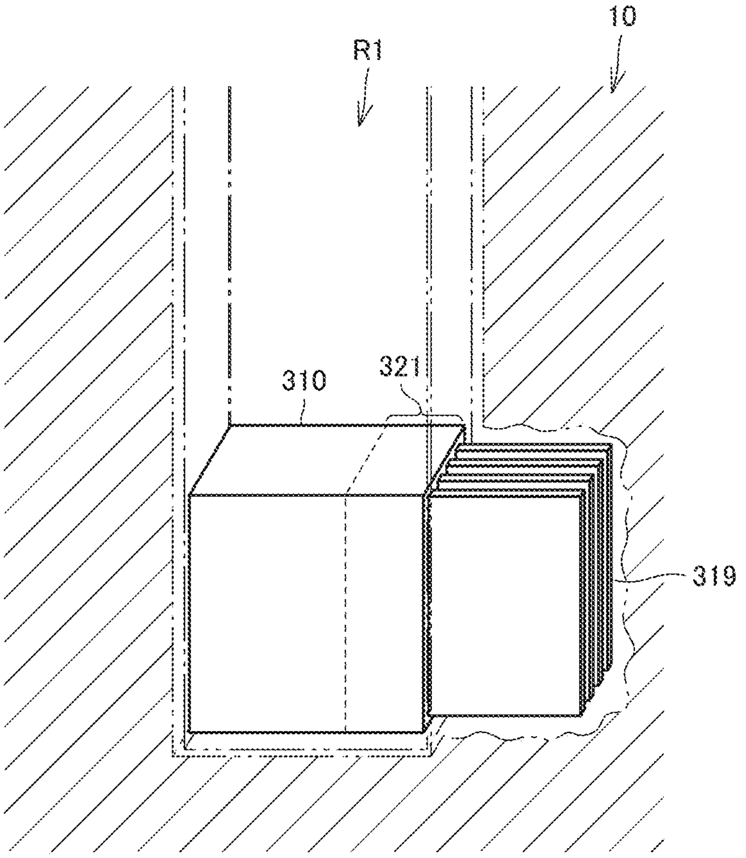
FIG. 6 is a diagram schematically showing a cooler for a power supply circuit according to a first embodiment.

FIG. 6 is a diagram schematically showing a cooler for power supply circuit 310 according to a first embodiment. Referring to FIGS. 6 and 1 to 5, power supply circuit 310 of EVSE 300 is adapted to include a fin 319. Fin 319 is connected to a heat generating portion 321 such as a power conversion circuit i.e., a power converter, of power supply circuit 310 to allow heat transfer.

When EVSE 300 is installed in recess R1, fin 319 is installed under a ground surface so as to be buried in soil 10 around recess R1. A substance existing under the ground surface such as soil 10 is normally lower in temperature than heat generating portion 321 when power supply circuit 310 operates. Therefore, soil 10 that is a substance having a low temperature is used to cool heat generating portion 321 of power supply circuit 310. As a result, EVSE 300 can efficiently exhaust heat.

In the first embodiment, fin 319 is provided on a lateral side of power supply circuit 310. This is not exclusive, however, and fin 319 may be provided at another position such as a lower surface of power supply circuit 310, or may be provided at a plurality of locations.

Second Embodiment

Figure 7:
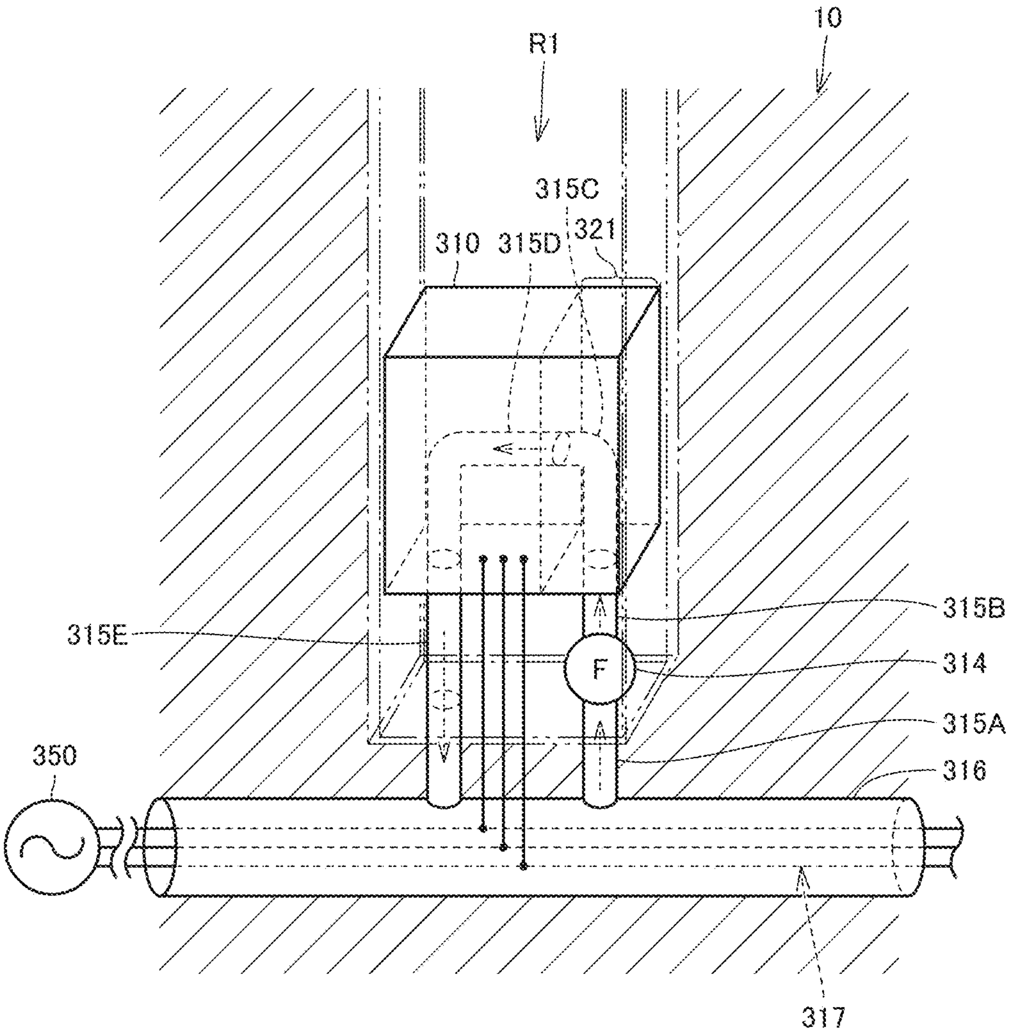
FIG. 7 is a diagram schematically showing a cooler for a power supply circuit according to a second embodiment.

FIG. 7 is a diagram schematically showing a cooler for power supply circuit 310 according to a second embodiment. Referring to FIG. 7, EVSE 300 is supplied with power from AC power supply 350 via a power line 317. Power line 317 is connected to power supply circuit 310 of EVSE 300 from AC power supply 350 through a wiring tunnel 316.

A pipe 315A is branched from wiring tunnel 316. Pipe 315A is guided into EVSE 300 and connected therein to a suction port of a cooling fan 314. Cooling fan 314 draws air from wiring tunnel 316 through pipe 315A and discharges the air to a pipe 315B connected to a discharging port. Pipe 315B is connected to a pipe 315C located in heat generating portion 321 of power supply circuit 310 of EVSE 300. In heat generating portion 321, air in pipe 315C and air of heat generating portion 321 exchange heat through a wall of pipe 315C. Pipe 315C is connected to a pipe 315D passing through a portion of power supply circuit 310 of EVSE 300 other than heat generating portion 321. Pipe 315D is connected to a pipe 315E provided outside power supply circuit 310 and guided from inside EVSE 300 to outside EVSE 300. Pipe 315E joins wiring tunnel 316. When cooling fan 314 operates, air in wiring tunnel 316 passes through pipes 315A to 315E and returns to wiring tunnel 316.

Wiring tunnel 316 is buried in soil 10 under the ground surface. A substance existing under the ground surface such as soil 10 is normally lower in temperature than heat generating portion 321 when power supply circuit 310 operates. Air inside wiring tunnel 316 is also normally lower in temperature than heat generating portion 321 when power supply circuit 310 operates. Cold air from wiring tunnel 316 passes through pipe 315C of heat generating portion 321 and thus cools air of heat generating portion 321. As a result, EVSE 300 can efficiently exhaust heat.

In the second embodiment, air in pipe 315C and air of heat generating portion 321 exchange heat through the wall of pipe 315C. This is not exclusive, however, and pipe 315C may be provided with a configuration for heat exchange (for example, a heat exchanger or a fin) to thereby exchange heat between the air in pipe 315C and the air of heat generating portion 321.

Third Embodiment

Figure 8:
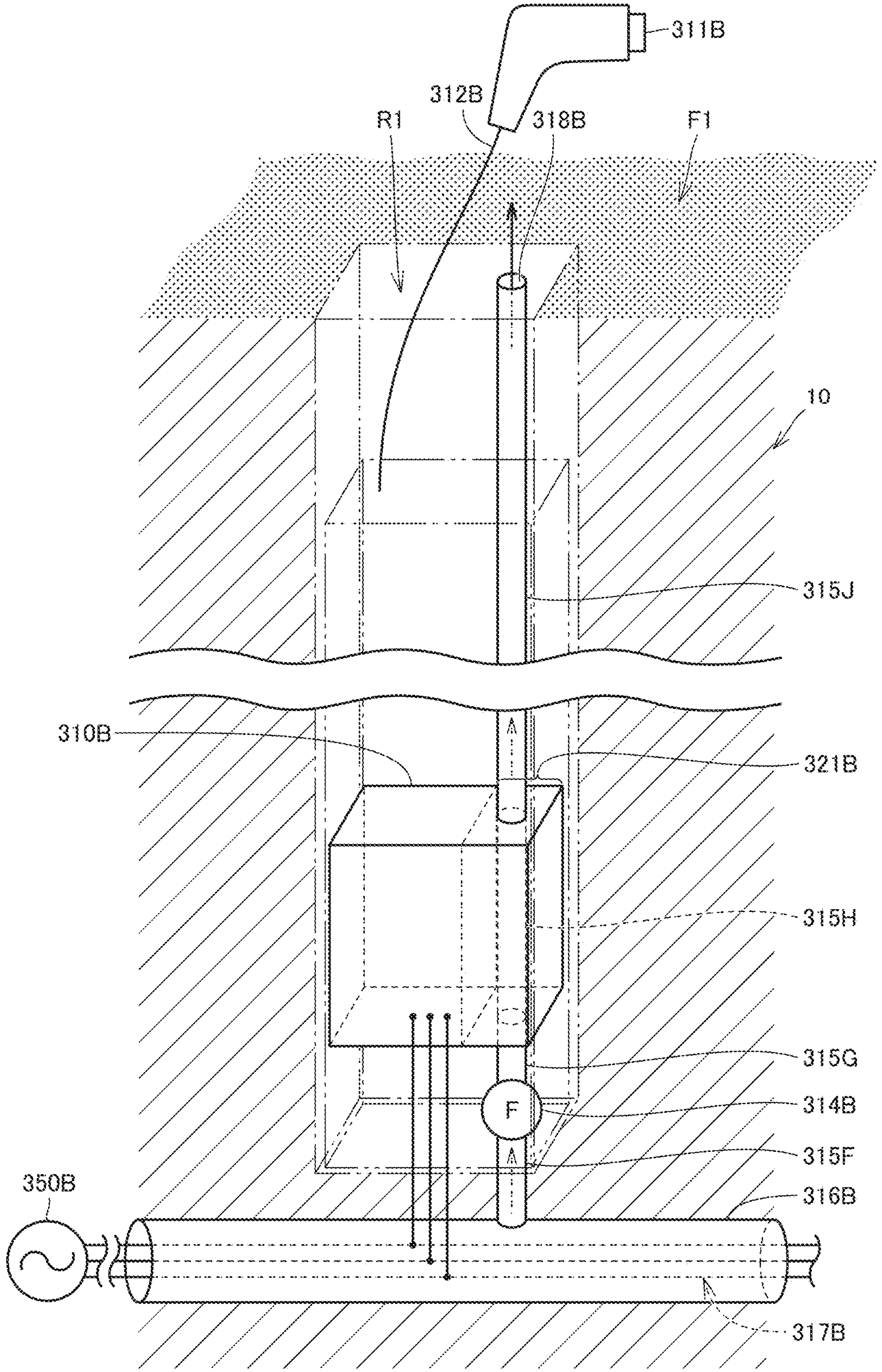
FIG. 8 is a diagram schematically showing a cooler for a power supply circuit according to a third embodiment.

FIG. 8 is a diagram schematically showing a cooler for power supply circuit 310B according to a third embodiment. Referring to FIG. 8, as well as in the second embodiment, EVSE 300B is supplied with power from AC power supply 350B via a power line 317B. Power line 317B is connected to power supply circuit 310B of EVSE 300B from AC power supply 350B through a wiring tunnel 316B.

A pipe 315F is branched from wiring tunnel 316B. Pipe 315F is guided into EVSE 300B and connected therein to a suction port of a cooling fan 314B. Cooling fan 314B draws air from wiring tunnel 316B through pipe 315F and discharges the air to a pipe 315G connected to a discharging port. Pipe 315G is connected to a pipe 315H in a heat generating portion 321B of power supply circuit 310B of EVSE 300B. In heat generating portion 321B, air in pipe 315H and air of heat generating portion 321B exchange heat through a wall of pipe 315H. Pipe 315H is connected to a pipe 315J provided outside power supply circuit 310B and guided from inside EVSE 300B to outside EVSE 300B. Pipe 315J has an exhaust port 318B provided at the level of ground surface F1.

Wiring tunnel 316B is buried in soil 10 under the ground surface. A substance existing under the ground surface such as soil 10 is normally lower in temperature than heat generating portion 321B when power supply circuit 310B operates. Air inside wiring tunnel 316B is also normally lower in temperature than heat generating portion 321B when power supply circuit 310B operates. Cold air from wiring tunnel 316B passes through pipe 315H of heat generating portion 321B and thus cools air of heat generating portion 321B. As a result, EVSE 300B can efficiently exhaust heat.

In the third embodiment, air in pipe 315H and air of heat generating portion 321B exchange heat through the wall of pipe 315H. This is not exclusive, however, and pipe 315H may be provided with a configuration for heat exchange (for example, a heat exchanger or a fin) to thereby exchange heat between the air in pipe 315H and the air of heat generating portion 321B.

Exemplary Variation (1) In the above-described embodiment, as shown in FIGS. 1 and 2, the power supply equipment is adapted to be EVSE 300 in which movable portion 301 including connector 311 and power feed cable 312 is movable from under a ground surface to above the ground surface and fixed portion 302 including power supply circuit 310 having heat generating portion 321 is provided under the ground surface. Further, as shown in FIGS. 3 and 4, it is adapted to be EVSE 300A in which only movable portion 301A having connector 311*a* is movable from under a ground surface to above the ground surface and casing 302A including power supply circuit 310A having a heat generating portion 321A is provided under the ground surface. Further, as shown in FIG. 5, it is adapted to be EVSE 300B in which only connector 311 and power feed cable 312B can be drawn out above the ground surface and casing 302B including power supply circuit 310B having heat generating portion 321B is provided under the ground surface.

This is not exclusive, however, and the power supply equipment may be power supply equipment in which a portion including a connector and a power feed cable is permanently provided on the ground surface and a portion including a heat generating portion is provided under the ground surface, or the power supply equipment may be power supply equipment in which a portion including a connector and a power feed cable is permanently provided on the ground surface and at least a portion of a portion including a heat generating portion is provided under the ground surface. The heat generating portion may be provided under the ground surface or may be provided above the ground surface.

(2) In the first embodiment described above, as shown in FIGS. 1 to 6, a substance in contact with fin 319 is soil 10 located under a ground surface. This is not exclusive, however, and the substance in contact with fin 319 may be any substance that is lower in temperature than heat generating portion 321 when power supply circuit 310 operates and that also exists under a ground surface, and may for example be gravel, rock, tap water flowing through a tap water pipe under a ground surface, well water guided from a well, groundwater guided from a groundwater vein, river water guided from a river through piping under a ground surface, air inside wiring tunnels 316 and 316B as indicated in the second and third embodiments, or air inside a sewage pipe.

(3) In the second and third embodiments described above, as shown in FIGS. 7 and 8, a substance passed to heat generating portion 321 of power supply circuit 310 of EVSE 300 is air of wiring tunnel 316. This is not exclusive, however, and the substance passed to heat generating portion 321 may be any substance that is lower in temperature than heat generating portion 321 when power supply circuit 310 operates and that also exists under a ground surface in the form of fluid, and may for example be tap water flowing through a tap water pipe under the ground surface, well water guided from a well, groundwater guided from a groundwater vein, river water guided from a river through piping under the ground surface, or air inside a sewage pipe.

(4) In the above-described embodiments, as shown in FIGS. 1 to 5, heat generating portions 321, 321A, and 321B are adapted to be included in power supply circuits 310, 310A, and 310B, respectively. This is not exclusive, however, and a heat generating portion included in a portion of power supply equipment such as EVSEs 300, 300A and 300B suffices, and it may for example be a power storage device (for example, a lithium ion battery, a nickel metal hydride battery, a solid-state battery, and an electric double layer capacitor) that temporarily stores power received from AC power supply 350.

(5) In the embodiments described above, power supply equipment such as EVSEs 300, 300A and 300B may supply vehicles 200 and 200A with AC power or DC power.

(6) In the embodiments described above, power supply equipment such as EVSEs 300, 300A and 300B is adapted to supply power to an electrically driven vehicle such as vehicles 200 and 200A. This is not exclusive, however, and the power supply equipment may supply power to transportation, or drones, mobile robots or any other devices that include battery 210 and require being fed with power, and the power supply equipment may supply power to a plug-in hybrid electric vehicle (PHEV).

(7) The above-described embodiments can be regarded as a disclosure of a power supply apparatus such as EVSEs 300, 300A, 300B, a disclosure of power supply systems 1, 1A, 1B including a plurality of power supply apparatuses, a disclosure of a cooler for a power supply apparatus such as a cooling device including fin 319, cooling fan 314 and pipes 315A to 315E, or cooling fan 314B and pipes 315F to 315J, and a disclosure of a method for cooling a power supply apparatus.

Summary (1) As shown in FIGS. 1 to 8, power supply equipment such as EVSEs 300, 300A, and 300B is power supply equipment that is at least partially provided under a ground surface and capable of supplying power to vehicles 200, 200A, and comprises connectors 311, 311A and 311B connectable to vehicles 200 and 200A and power feed cables 312, 312A and 312B in order to supply power to vehicles 200 and 200A on the ground surface, power supply circuits 310, 310A and 310B that supply power to connectors 311, 311A and 311B and power feed cables 312, 312A and 312B, and a cooler that cools power supply circuits 310, 310A and 310B using a substance existing under the ground surface.

Thus, power supply circuits 310, 310A, and 310B that supply power for supplying power to vehicles 200 and 200A are cooled by using the substance existing under the ground surface. The substance existing under the ground surface is normally lower in temperature than heat generating portions 321, 321A, 321B of power supply circuits 310, 310A, 310B. Therefore, the substance having a low temperature is used to cool heat generating portions 321, 321A, 321B of power supply circuits 310, 310A, 310B. As a result, the power supply equipment can efficiently exhaust heat.

(2) As shown in FIGS. 1 to 6, the cooler includes fin 319 capable of heat transfer to and from power supply circuit 310, and fin 319 is disposed in contact with a substance (for example, soil, gravel, rock, tap water, well water, groundwater, river water, air.). Thus, heat generating portion 321 of power supply circuits 310 is cooled by heat transfer by fin 319 in contact with the substance. As a result, the power supply equipment can efficiently exhaust heat.

(3) As shown in FIGS. 7 and 8, the substance is a fluid (e.g., air, tap water, well water, groundwater, river water), and the cooler may include a passage unit (for example, cooling fan 314 and pipes 315A to 315E, and cooling fan 314B and pipes 315F to 315J) to pass the substance to power supply circuits 310, 310A, 310B. According to such a configuration, heat generating portions 321, 321A, and 321B of power supply circuits 310, 310A, and 310B are cooled by heat transfer to the substance as it passes in contact with a heat generating portion of a power converter. As a result, the power supply equipment can efficiently exhaust heat.

(4) As shown in FIG. 7, the passage unit may draw the substance from a source under a ground surface (for example, wiring tunnel 316, a tap water pipe, a pipe which guides well water from a well, a pipe which guides groundwater from a groundwater vein, and a pipe which guides river water from a river), and return the substance to the source after the substance is passed through power supply circuit 310. Thus, the cold substance drawn from the source located under the ground surface removes heat from heat generating portion 321 of power supply circuits 310 and is thereafter returned to the source. Thus, the heat of heat generating portion 321 is transferred to the source of the cold substance. As a result, the power supply equipment can efficiently exhaust heat.

(5) As shown in FIG. 8, the passage unit may discharge the substance on the ground surface after the substance is passed through power supply circuit 310B. Thus, the cold substance drawn from the source located under the ground surface removes heat from heat generating portion 321B of power supply circuits 310B and is thereafter discharged on the ground surface. Thus, the heat of heat generating portion 321B of power supply circuits 310B is discharged to the atmosphere above the ground surface, and the atmosphere above the ground surface normally has a temperature lower than that of heat generating portion 321B. As a result, the power supply equipment can efficiently exhaust heat.

Although the embodiments of the present invention have been described, it should be considered that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. Power supply equipment at least partially provided under a ground surface and configured for supplying power to a vehicle, the power supply equipment comprising:
- a connector cable that is connectable to the vehicle to feed power to the vehicle on the ground surface;
- a power converter configured to supply power to the connector cable; and
- a cooler configured to cool the power converter using a substance existing under the ground surface, wherein the substance is air inside a wiring tunnel, the cooler includes a passage unit configured to draw the substance from sources under the ground surface outside the power supply equipment, pass the substance to the power converter, and discharge the substance outside the power supply equipment after the substance has passed through the power converter, the power supply equipment further comprises a power line located in the wiring tunnel, and electrically coupled to the power converter to provide power to the power converter, the passage unit includes a pipe system having:

a first pipe branched from the wiring tunnel;

a second pipe; and a cooling fan connected between the first pipe and second pipe, the cooling fan being configured to draw the substance from of the wiring tunnel through the first pipe and discharge the substance to the second pipe, the pipe system further includes a third pipe and a fourth pipe, the second pipe is connected to the third pipe which passes through the power converter, and the third pipe is connected to the fourth pipe which is provided outside the power converter.

2. The power supply equipment according to claim 1, wherein the passage unit is further configured to return the substance to the wiring tunnel after the substance has passed through the power converter.

3. The power supply equipment according to claim 1, wherein the passage unit is further configured to discharge the substance on the ground surface after the substance has passed through the power converter.

4. The power supply equipment according to claim 1, wherein the third pipe is configured for heat exchange between the substance supplied from the wiring tunnel and air inside the power converter.

5. The power supply equipment according to claim 4, wherein the fourth pipe has an exhaust port at a level of the ground surface.

6. The power supply equipment according to claim 5, wherein the third pipe comprises a wall through which the heat exchange is to be performed between the substance supplied from the wiring tunnel and the air inside the power converter.

7. The power supply equipment according to claim 5, wherein the third pipe comprises a heat exchanger or a fin configured to perform the heat exchange between the substance supplied from the wiring tunnel and the air inside the power converter.

8. The power supply equipment according to claim 4, wherein the fourth pipe is joined to the wiring tunnel at a location different from where the first pipe is branched from the wiring tunnel.

9. The power supply equipment according to claim 8, wherein the third pipe comprises a wall through which the heat exchange is to be performed between the substance supplied from the wiring tunnel and the air inside the power converter.

10. The power supply equipment according to claim 8, wherein the third pipe comprises a heat exchanger or a fin configured to perform the heat exchange between the substance supplied from the wiring tunnel and the air inside the power converter.

* * * * *